(12) United States Patent
Persinger

(10) Patent No.: US 11,306,804 B1
(45) Date of Patent: Apr. 19, 2022

(54) TORQUE CONVERTER WITH CROSS-FLOW PRESSURE CHAMBERS

(71) Applicant: Schaeffler Technologies AG & Co. KG, Herzogenaurach (DE)

(72) Inventor: Justin Persinger, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/176,220

(22) Filed: Feb. 16, 2021

(51) Int. Cl.
*F16H 45/02* (2006.01)

(52) U.S. Cl.
CPC ....... *F16H 45/02* (2013.01); *F16H 2045/021* (2013.01); *F16H 2045/0294* (2013.01)

(58) Field of Classification Search
CPC .......................... F16H 2045/0205–021; F16H 2045/0273–0294
See application file for complete search history.

(56) References Cited

U.S. PATENT DOCUMENTS

| | | | | |
|---|---|---|---|---|
| 8,967,349 | B2 * | 3/2015 | Ushio | F16D 33/18 192/3.29 |
| 2012/0298471 | A1 * | 11/2012 | Heck | F16D 1/0858 192/112 |
| 2018/0313407 | A1 * | 11/2018 | Smith | F16H 45/02 |
| 2020/0263773 | A1 | 8/2020 | Persinger | |

* cited by examiner

*Primary Examiner* — Ernesto A Suarez
*Assistant Examiner* — James J Taylor, II
(74) *Attorney, Agent, or Firm* — Volpe Koenig

(57) ABSTRACT

A torque converter, including: a cover including a first surface facing in a first radial direction; an impeller; a stator; and a lock-up clutch including a piston plate and a seal plate including a second surface in a press fit with the first surface. The cover and the piston plate define at least a portion of a first pressure chamber. The piston plate and the seal plate define at least a portion of a second pressure chamber. The first pressure chamber and the second pressure chamber are arranged to receive and expel a fluid to axially displace the piston plate to open and close the lock-up clutch. The cover and the seal plate define a through-bore with: an end terminating at the first pressure chamber; or an end terminating at the second pressure chamber. The cover includes an edge defining an end of the through-bore.

20 Claims, 10 Drawing Sheets

TORQUE CONVERTER WITH CROSS-FLOW PRESSURE CHAMBERS

TECHNICAL FIELD

The present disclosure relates to a torque converter with cross-flow pressure chambers.

BACKGROUND

Known torque converters use forged and machined components with cross-flow channels for pressure chambers, increasing the cost and complexity of the torque converter.

SUMMARY

According to aspects illustrated herein, there is provided a torque converter, including: a cover arranged to receive rotational torque and including a first surface facing at least partly in a first radial direction orthogonal to an axis of rotation of the torque converter; an impeller including an impeller shell fixed to the cover and at least one impeller blade fixed to the impeller shell; a turbine including a turbine shell and at least one turbine blade fixed to the turbine shell; a stator including at least one stator blade axially disposed between the impeller shell and the turbine shell; and a lock-up clutch including a piston plate and a seal plate including a second surface in a press fit with the first surface. The cover and the piston plate define at least a portion of a first pressure chamber. The piston plate and the seal plate define at least a portion of a second pressure chamber. The first pressure chamber and the second pressure chamber are arranged to receive and expel a fluid to axially displace the piston plate to open and close the lock-up clutch. The cover and the seal plate define: a through-bore with a first end terminating at the first pressure chamber; or a through-bore with a first end terminating at the second pressure chamber. The cover includes an edge defining the first end of the through-bore.

According to aspects illustrated herein, there is provided a torque converter, including: a cover arranged to receive rotational torque and including a first surface facing at least partly in a first radial direction orthogonal to an axis of rotation of the torque converter; an impeller including an impeller shell fixed to the cover and at least one impeller blade fixed to the impeller shell; a turbine including turbine shell and at least one turbine blade fixed to the turbine shell; a stator including at least one stator blade axially disposed between the impeller shell and the turbine shell; and a lock-up clutch including a piston plate and a seal plate including a second surface in a press fit with the first surface. The cover and the piston plate define at least a portion of a first pressure chamber. The piston plate and the seal plate define at least a portion of a second pressure chamber. The first pressure chamber and the second pressure chamber are arranged to receive and expel a fluid to axially displace the piston plate to open and close the lock-up clutch. A portion of the cover and a portion of the seal plate completely define a groove with a first end: terminating at the first pressure chamber; or terminating at the second pressure chamber.

According to aspects illustrated herein, there is provided a method of operating a torque converter including a cover, an impeller, a turbine, a stator, an output element, and a lock-up clutch including a piston plate and a seal plate non-rotatably connected to the cover. The method includes: operating in a torque converter mode by receiving a rotational torque with the cover and transmitting the rotational torque to the output element via the impeller and the turbine; and shifting from the torque converter mode to a lock-up mode by: draining a first fluid from a release pressure chamber defined at least in part by the cover and the piston plate via a through-bore with a first end defined by an edge of the cover and a second end defined by an edge of the seal plate, pumping a second fluid into an apply pressure chamber defined at least in part by the piston plate and the seal plate via a groove defined by the cover and the seal plate, displacing the piston plate in a first axial direction with the second fluid, closing the lock-up clutch, and transmitting the rotational torque to the output element via the lock-up clutch; or draining a first fluid from a release pressure chamber defined at least in part by the cover and the piston plate via a groove defined by the cover and the seal plate, pumping a second fluid into an apply pressure chamber defined at least in part by the piston plate and the seal plate via a through-bore with a first end defined by an edge of the cover and a second end defined by an edge of the seal plate, displacing the piston plate in a first axial direction with the second fluid, closing the lock-up clutch, and transmitting the rotational torque to the output element via the lock-up clutch.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
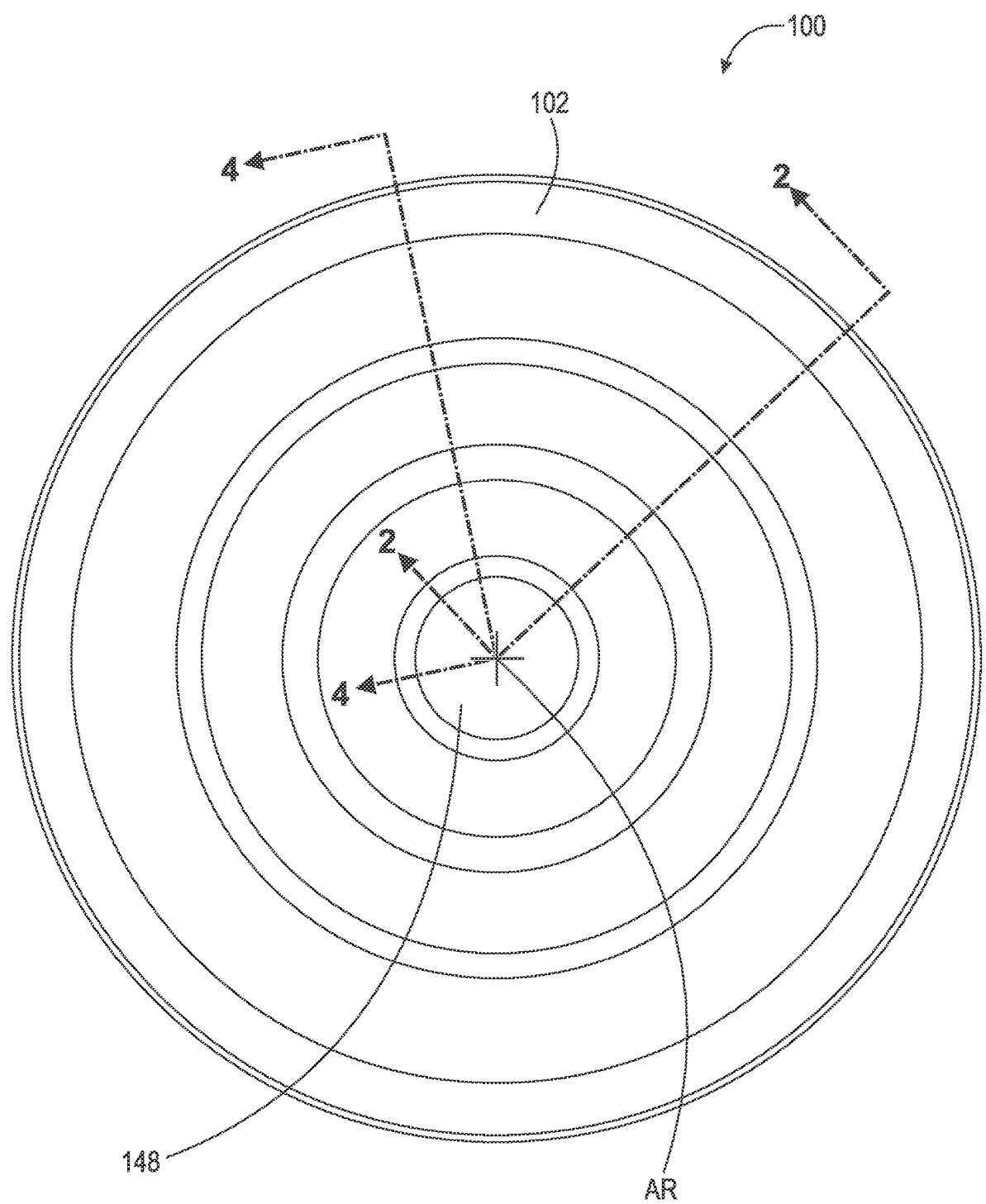
FIG. 1 is a front view of an example torque converter with cross-flow pressure chambers.

FIG. 1 is a front view of example torque converter 100 with cross-flow pressure chambers.

Figure 2:
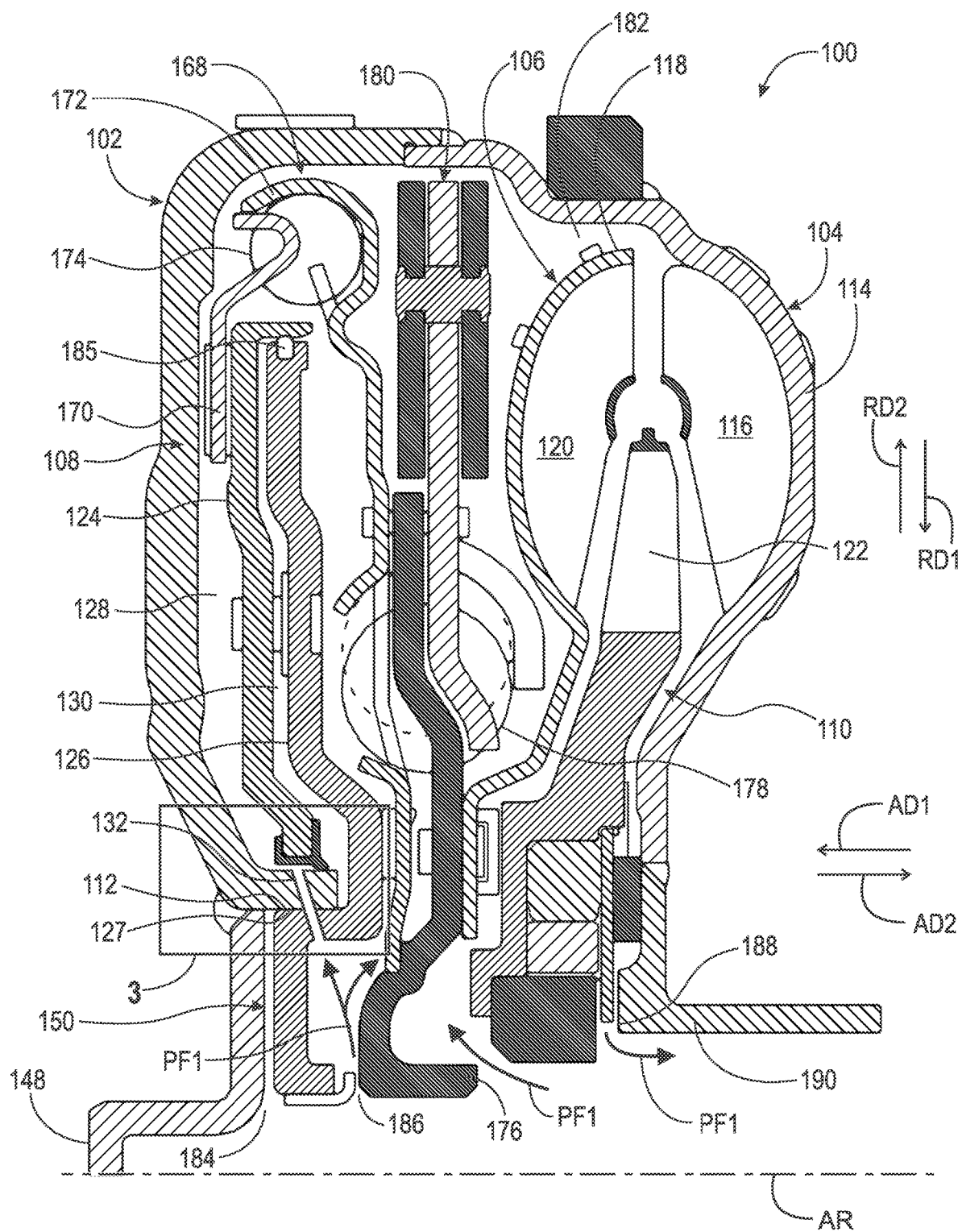
FIG. 2 is a cross-sectional view generally along line 2-2 in FIG. 1.

FIG. 2 is a cross-sectional view generally along line 2-2 in FIG. 1.

Figure 3:
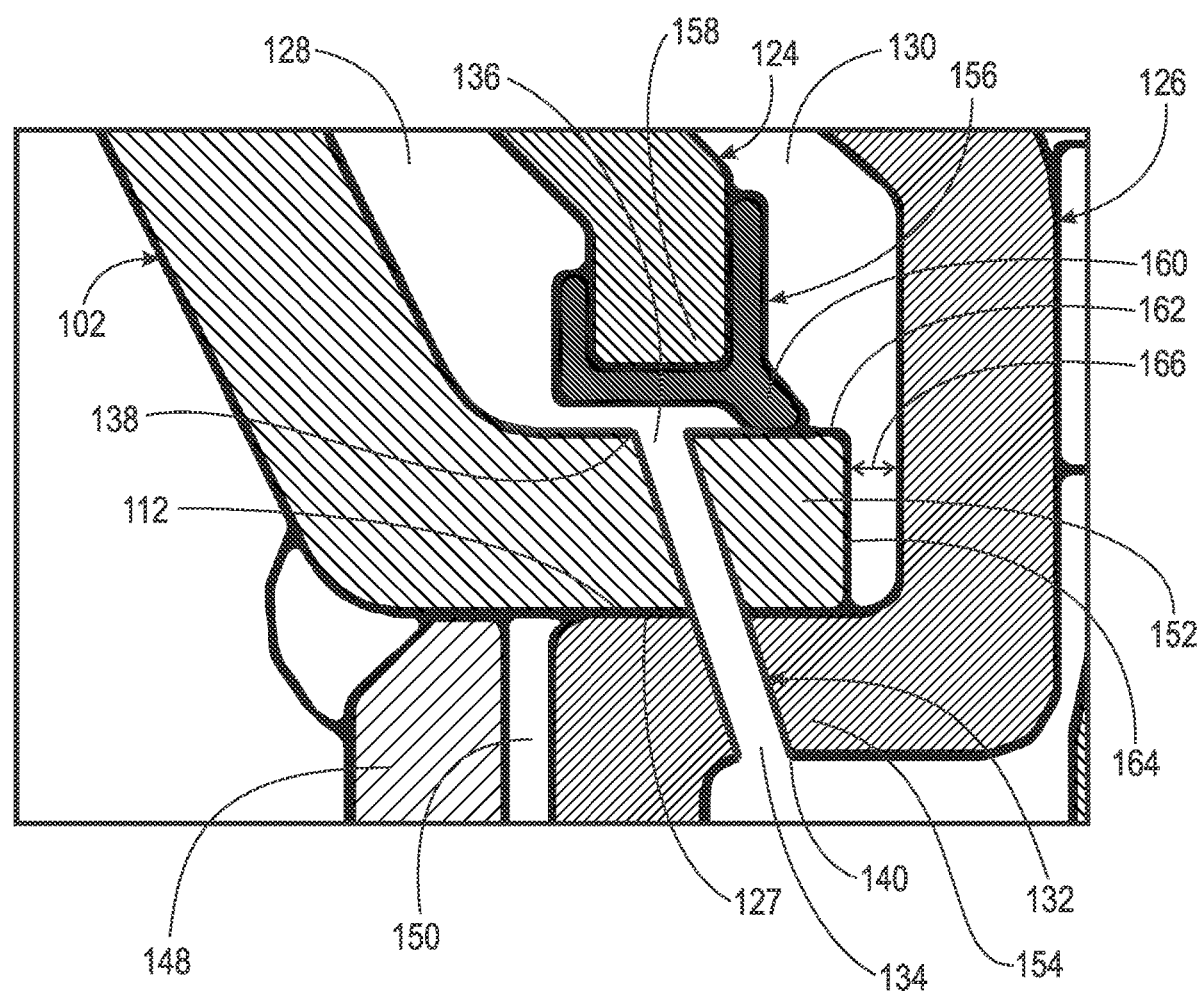
FIG. 3 is a detail of area 3 in FIG. 2.

FIG. 3 is a detail of area 3 in FIG. 2. The following should be viewed in light of FIGS. 1 through 3. Torque converter 100 includes: cover 102; impeller 104; turbine 106; lock-up clutch 108; and stator 110. Cover 102 is arranged to receive rotational torque and includes surface 112 facing at least partly in radially inner direction RD1, orthogonal to axis of rotation AR of torque converter 100. In the example of FIG. 1, surface 112 is orthogonal to axis AR. Impeller 104 includes impeller shell 114, fixed to cover 102, and at least one impeller blade 116 fixed to impeller shell 114. Turbine 106 includes turbine shell 118 and at least one turbine blade 120 fixed to turbine shell 118. Stator 110 includes at least one stator blade 122 axially disposed between impeller shell 114 and turbine shell 118.

Lock-up clutch 108 includes: piston plate 124; and seal plate 126 including surface 127 facing at least partly in radial direction RD2, opposite direction RD1, in a press fit with surface 112. The press fit non-rotatably connects cover 102 and seal plate 126. By "press fit" we mean an interference fit between cover 102 and seal plate 126 in which cover 102 and seal plate 126 are forced together under pressure. For example, prior to surface 112 and surface 127 being forced together: a diameter of surface 127 is slightly larger than a diameter of surface 112; or a diameter of surface 112 is slightly smaller than a diameter of surface 127. In the example of FIG. 1, surface 127 is orthogonal to axis AR.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Cover 102 and piston plate 124 define at least a portion of release pressure chamber 128. Piston plate 124 and seal plate 126 define at least a portion of apply pressure chamber 130. Release pressure chamber 128 and apply pressure chamber 130 are arranged to receive and expel pressurized fluid to axially displace piston plate 124 to open and close lock-up clutch 108. In the example of FIG. 1, cover 102 and seal plate 126 define through-bore 132 with: end 134; and end 136 terminating at release pressure chamber 128. That is, end 136 opens to release pressure chamber 128. Edge 138 of cover 102 completely defines end 136 and edge 140 of seal plate 126 completely defines end 134. By "completely defines" an end, we mean that no other element or component defines any portion of the end and the through-bore does not extend past end 134 or end 136.

Figure 4:
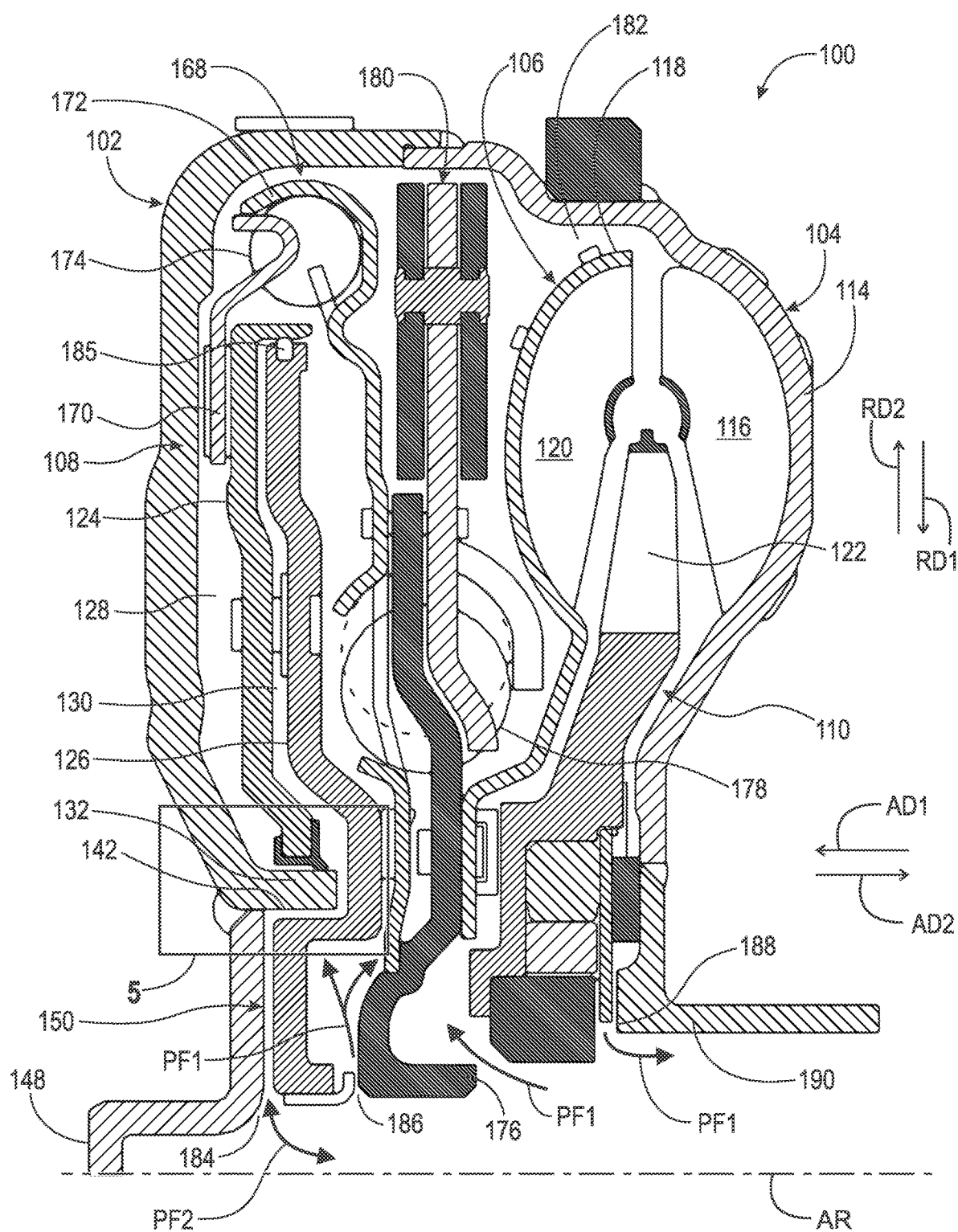
FIG. 4 is a cross-sectional view generally along line 4-4 in FIG. 1.

FIG. 4 is a cross-sectional view generally along line 4-4 in FIG. 1.

Figure 5:
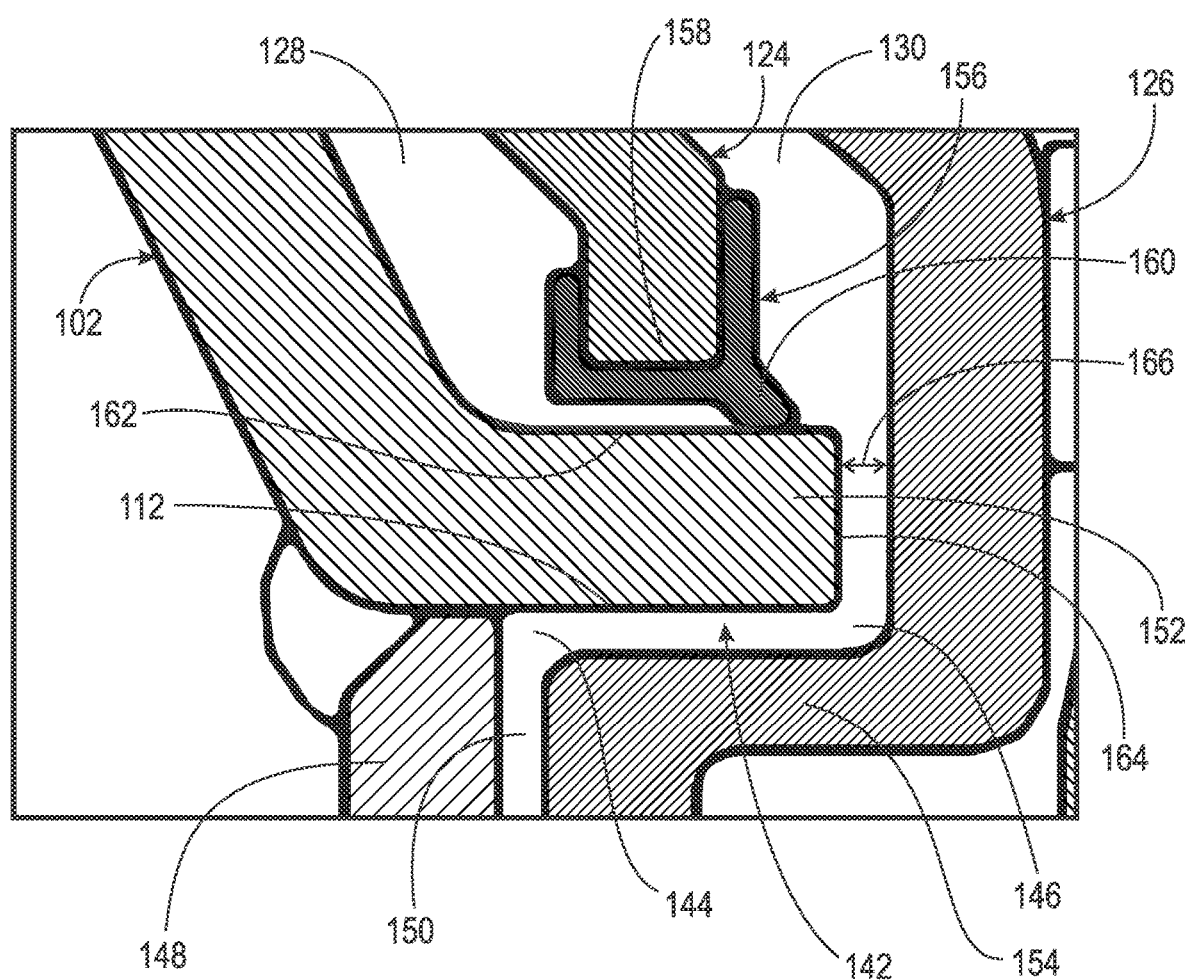
FIG. 5 is a detail of area 5 in FIG. 4.

FIG. 5 is a detail of area 5 in FIG. 4. The following should be viewed in light of FIGS. 1 through 5. In the example of FIG. 1, cover 102 and seal plate 126 completely define groove 142 with: end 144; and end 146 terminating at apply chamber 130. That is, end 146 opens to apply chamber 130. By "completely define" groove 142, we mean that no other element or component defines any portion of groove 142 and groove 142 does not extend past end 144 or end 146. In the example of FIG. 1: torque converter 100 includes hub 148; axis AR passes through material forming hub 148; hub 148 and seal plate 126 define, at least partly, channel 150; and end 144 terminates at channel 150. That is, end 146 opens to apply chamber 130

In the example of FIG. 1: portion 152 of cover 102 and portion 154 of seal plate 126 completely define through-bore 132 and groove 142; and portion 152 is radially outward of portion 154.

In the example of FIG. 1: torque converter 100 includes seal 156 sealed against radially inner end 158 of piston plate 124 and including portion 160 sealed against surface 162 of portion 152 facing at least partly in direction RD2. In the example of FIG. 1, surface 162 is orthogonal to axis AR. Axial end 164 of cover 102 is separated, in axial direction AD1, parallel to axis AR, by gap 166. In the example of FIG. 1, gap 166 is uniform around axis AR. Groove 142 extends to end 164. End 136 is located past portion 160 in direction AD1, and end 146 is located past portion 160 in direction AD2, opposite direction AD1.

In the example of FIG. 1: torque converter 100 includes pendulum vibration damper 168; and lock-up clutch 108 includes clutch plate 170. Damper 168 includes: retainer plate 172; at least one spring 174 engaged with clutch plate 170 and retainer plate 172; output element 176; at least one spring 178 engaged with retainer plate 172 and output element 176; and pendulum damper 180 engaged with springs 178.

Output element 176 is arranged to non-rotatably connect to a transmission input shaft (not shown). In a torque converter mode of torque converter 100: cover 102 is arranged to receive rotational torque; clutch 108 is open; and the torque is transmitted to output element 176 via impeller 104 and turbine 106. In a lock-up mode of torque converter 100: cover 102 is arranged to receive rotation torque; clutch 108 is closed; and the torque is transmitted to output element 176 via clutch 108.

Chambers 128 and 130 are arranged to receive and expel pressurized fluid to control axial displacement of piston plate 124. To transition from the torque converter mode to the lock-up mode: pressurized fluid PF1 in chamber 128 is drained or expelled from chamber 128 via through-bore 132, and into pressure chamber 182 defined, at least in part, by seal plate 126, cover 102, and impeller shell 114. Pressurized fluid PF2 is pumped into chamber 130 through channel 150 and groove 142; and fluid PF2 in chamber 130 displaces piston plate 124 in direction AD1 to close clutch 108 by non-rotatably connecting cover 102, piston plate 124, and clutch plate 170. The torque is transmitted: from cover 102, to piston plate 124; to clutch plate 170; and to output element 176 via damper 168.

To transition from the lock-up mode to the torque converter mode: pressurized fluid PF2 is drained or expelled from chamber 130 through groove 142 and channel 150; pressurized fluid PF1 is pumped through opening 186, between seal plate 126 and output element 176, and through-bore 132 into chamber 128; and fluid PF1 in chamber 128 displaces piston plate 124 in direction AD2 to open clutch 108 by breaking the non-rotatable connection of cover 102 and clutch plate 170.

In the example of FIG. 1: torque converter 100 is a three-pass torque converter with three pressurized fluid circuits; and, with the exception of opening 184 of channel 150, apply chamber 130 is sealed from chamber 128 and chamber 182 by seal 156 and seal 185. Pressurized fluid PF1 is pumped to chambers 128 and 182 via opening 186 between seal plate 126 and output element 176 and fluid PF1 is drained through opening 188 defined in part by impeller hub 190. Pressurized fluid PF2 is drained from and pumped to apply chamber 130 via opening 184, channel 150, and groove 142.

Figure 6:
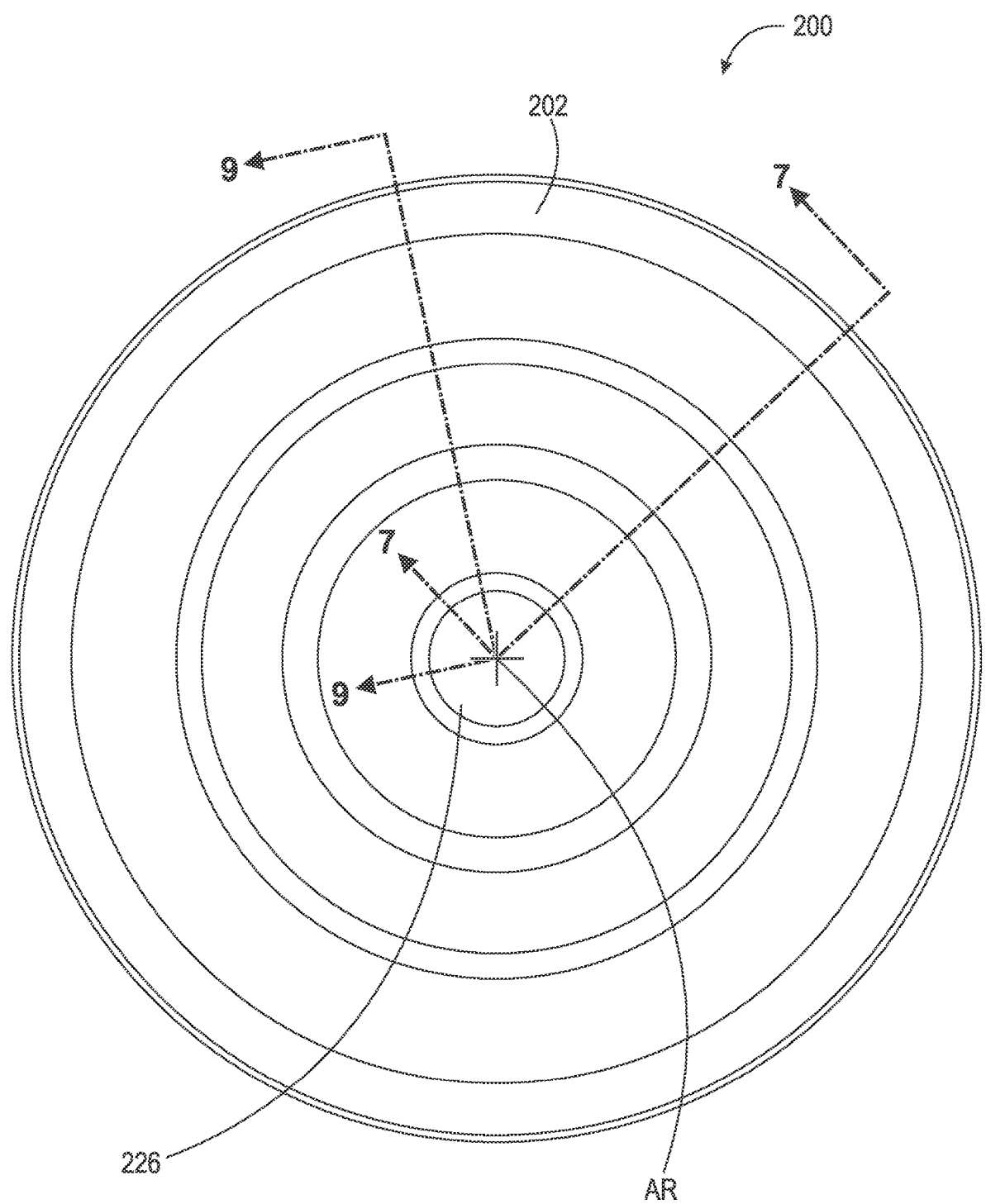
FIG. 6 is a front view of an example torque converter with cross-flow pressure chambers.

FIG. 6 is a front view of example torque converter 200 with cross-flow pressure chambers.

Figure 7:
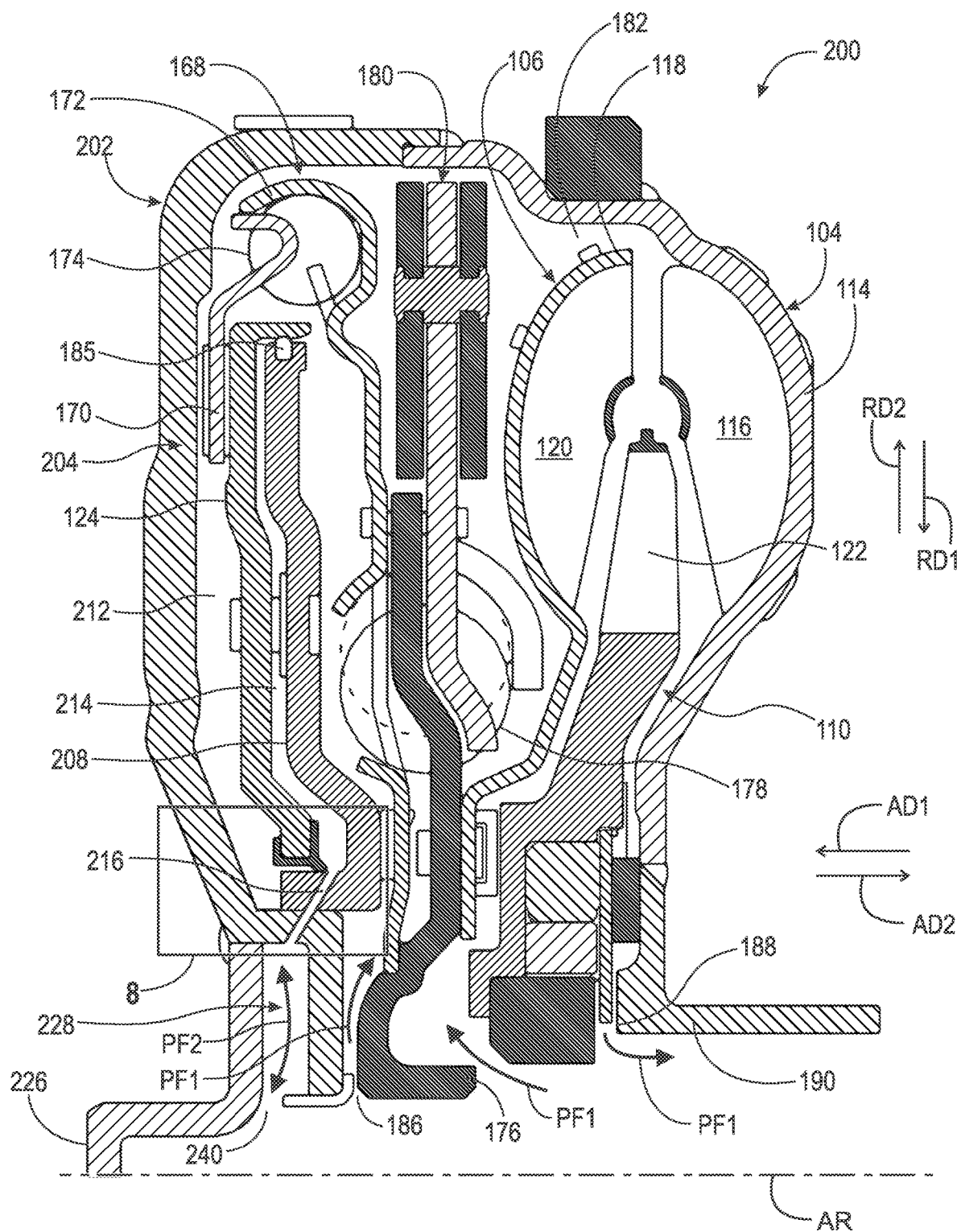
FIG. 7 is an example cross-sectional view generally along line 7-7 in FIG. 6.

FIG. 7 is an example cross-sectional view generally along line 7-7 in FIG. 6.

Figure 8:
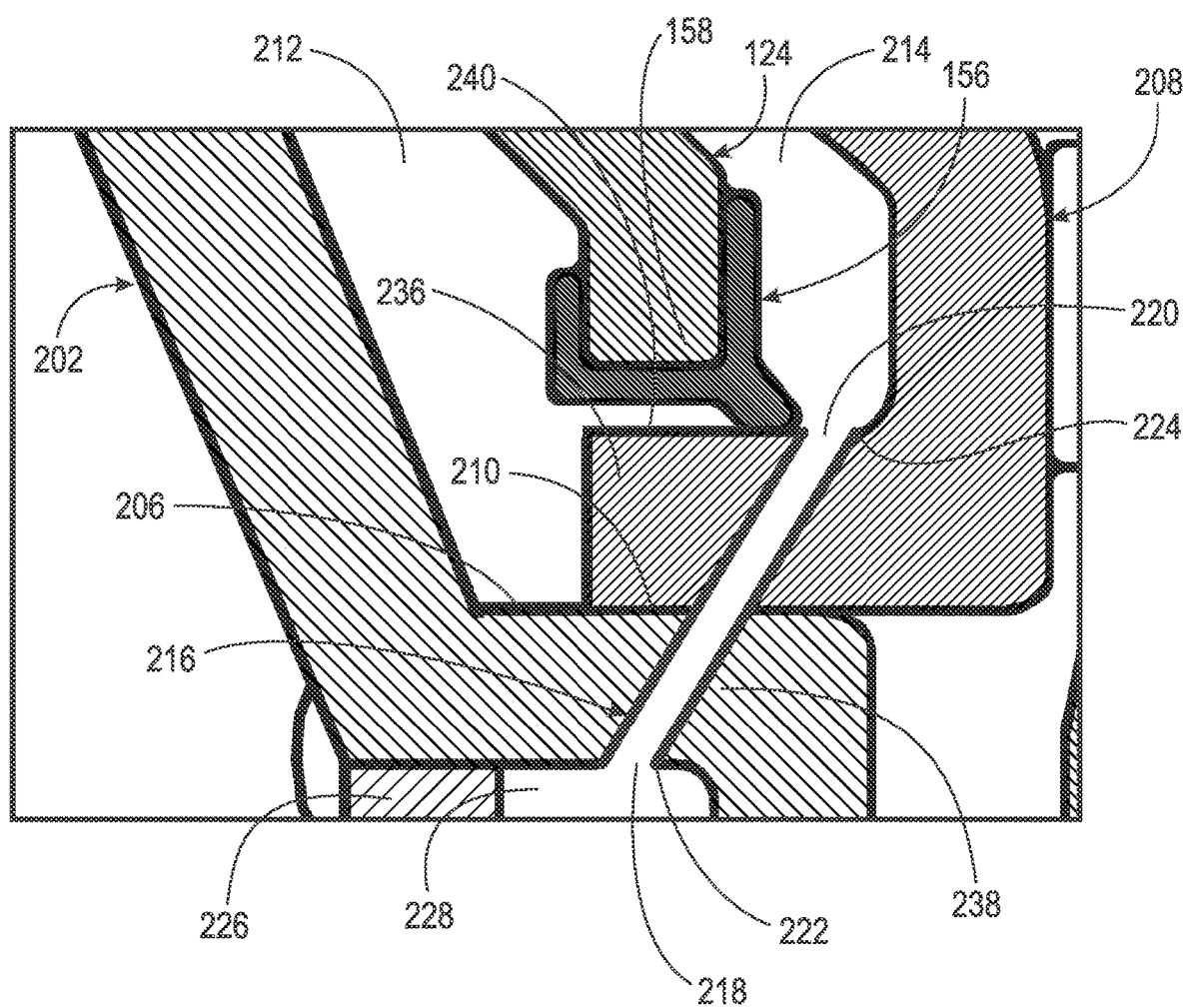
FIG. 8 is a detail of area 8 in FIG. 7.

FIG. 8 is a detail of area 8 in FIG. 7. The following should be viewed in light of FIGS. 6 through 8. The discussion for FIG. 1 is applicable to FIG. 6 except as noted. Torque converter 200 includes: cover 202; impeller 104; turbine 106; lock-up clutch 204; and stator 110. Cover 202 is arranged to receive rotational torque, and includes surface 206 facing at least partly in radially outer direction RD2. In the example of FIG. 6, surface 206 is orthogonal to axis AR. Impeller 104 includes impeller shell 114, fixed to cover 202, and at least one impeller blade 116 fixed to impeller shell 114. Turbine 106 includes turbine shell 118 and at least one turbine blade 120 fixed to turbine shell 118. Stator 110 includes at least one stator blade 122 axially disposed between impeller shell 114 and turbine shell 118.

Lock-up clutch 204 includes: piston plate 124; and seal plate 208 including surface 210 facing at least partly in direction RD1 and in a press fit with surface 206. The press fit non-rotatably connects cover 202 and seal plate 208. In the example of FIG. 6, surface 112 is orthogonal to axis AR. Cover 202 and piston plate 124 define at least a portion of release pressure chamber 212. Piston plate 124 and seal plate 208 define at least a portion of apply pressure chamber 214. Release pressure chamber 212 and apply pressure chamber 214 are arranged to receive and expel pressurized fluid to axially displace piston plate 124 to open and close lock-up clutch 204. In the example of FIG. 6, cover 202 and seal plate 208 define through-bore 216 with: end 218; and end 220 terminating at apply pressure chamber 214. That is, end 220 opens to apply pressure chamber 214. Edge 222 of cover 202 completely defines end 218 and edge 224 of seal plate 208 completely defines end 220.

In the example of FIG. 6: torque converter 200 includes hub 226; axis AR passes through material forming hub 226; and hub 226 and cover 202 define, at least partly, channel 228. End 218 terminates at channel 228. That is, end 218 opens to channel 228

Figure 9:
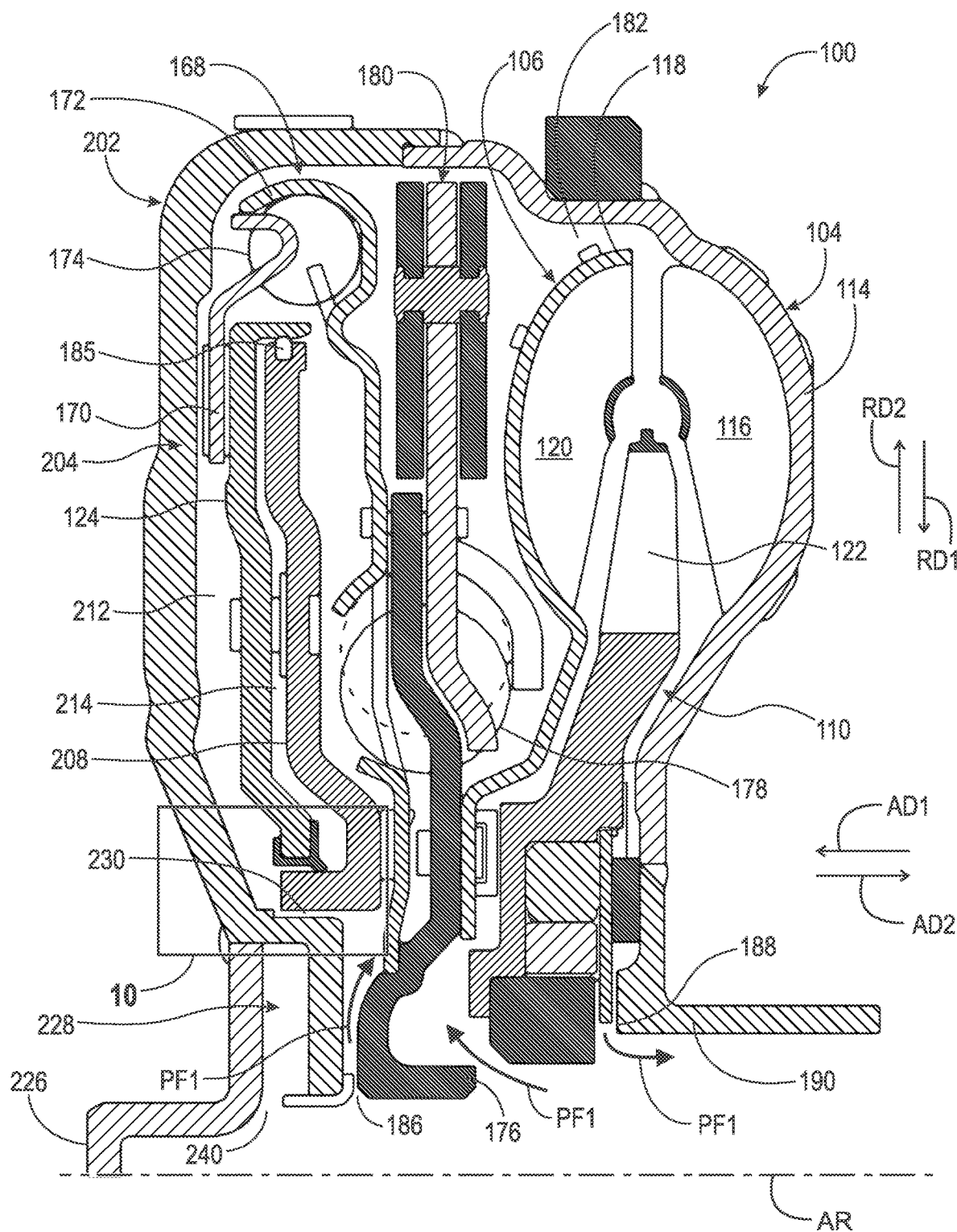
FIG. 9 is an example cross-sectional view generally along line 9-9 in FIG. 6.

FIG. 9 is an example cross-sectional view generally along line 9-9 in FIG. 6.

Figure 10:
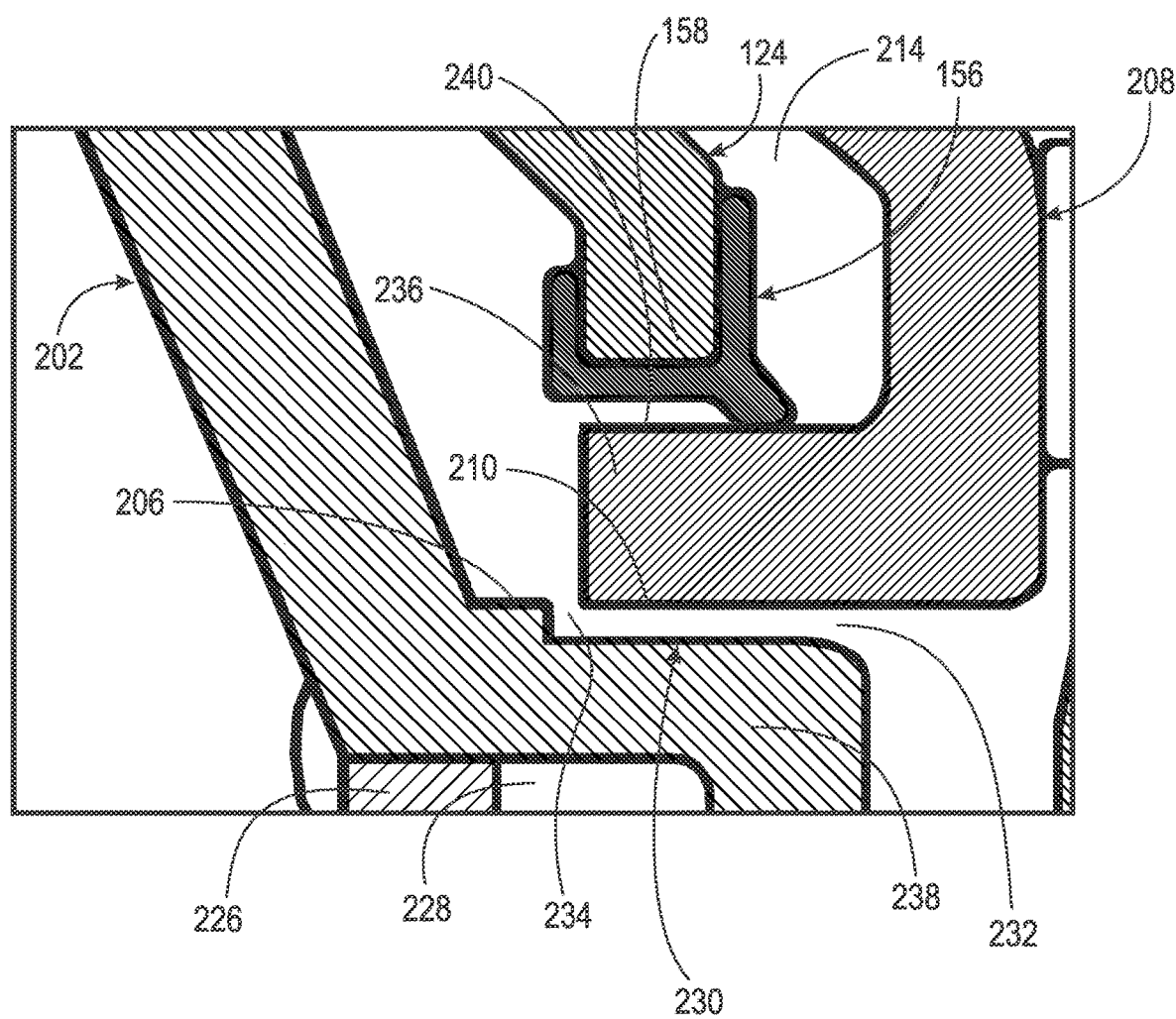
FIG. 10 is a detail of area 10 in FIG. 9.

FIG. 10 is a detail of area 10 in FIG. 9. The following should be viewed in light of FIGS. 6 through 10. In the example of FIGS. 9 and 10, cover 202 and seal plate 208 completely define groove 230 with: end 232; and end 234 terminating at release pressure chamber 212. That is, end 234 opens release pressure chamber 212.

In the example of FIG. 6: portion 236 of seal plate 208 and portion 238 of cover 202 define through-bore 216 and groove 230; and portion 236 is radially outward of portion 238. In the example of FIG. 6, portion 160 of seal 156 is sealed against surface 240 of seal plate 208. In the example of FIG. 1, surface 240 is orthogonal to axis AR. In the example of FIG. 6, end 220 is located past portion 160 in direction AD2, and end 234 is located past portion 160 in direction AD1.

Chambers 212 and 214 are arranged to receive and expel pressurized fluid to control axial displacement of piston plate 124. To transition from the torque converter mode to the lock-up mode: pressurized fluid PF1 in chamber 212 is drained or expelled from chamber 212 via through-bore groove 230 and into chamber 182. Pressurized fluid PF2 is pumped into chamber 214 through channel 228 and through-bore 216; and fluid PF2 in chamber 214 displaces piston plate 124 in direction AD1 to close clutch 204 by non-rotatably connecting cover 202, piston plate 124 and clutch plate 170. The torque is transmitted: from cover 202, to piston plate 124; to clutch plate 170; and to output element 176 via damper 168.

To transition from the lock-up mode to the torque converter mode: pressurized fluid PF2 is drained or expelled from chamber 214 through through-bore 216 and channel 228; pressurized fluid PF1 is pumped through groove 230 into chamber 212; and fluid PF1 in chamber 212 displaces piston plate 124 in direction AD2 to open clutch 204 by breaking the non-rotatable connection of cover 202 and clutch plate 170.

In the example of FIG. 6: torque converter 200 is a three-pass torque converter with three pressurized fluid circuits; and, with the exception of opening 240 of channel 228, apply chamber 214 is sealed from chamber 212 and chamber 182 by seal 156 and seal 185. Pressurized fluid PF1 is pumped to chambers 212 and 182 via opening 186 and fluid PF1 is drained through opening 188. Pressurized fluid PF2 is drained from and pumped to apply chamber 214 via opening 240 and channel 228.

The following should be viewed in light of FIGS. 1 through 5. The following describes a method of operating torque converter 100. Although the method is presented as a sequence of steps for clarity, no order should be inferred from the sequence unless explicitly stated. A first step operates torque converter 100 in the torque converter mode by: receiving a rotational torque with cover 102; and transmitting the rotational torque to output element 176 via impeller 104 and turbine 106. A second step shifts from the torque converter mode to the lock-up mode by: draining fluid PF1 from release pressure chamber 128 via through-bore 132; pumping fluid PF2 into apply pressure chamber 128 via channel 150 and groove 142; displacing, with fluid PF2, piston plate 124 in axial direction AD1; closing lock-up clutch 108; and transmitting the rotational torque to output element 176 via lock-up clutch 108 and damper 168. A third step shifts from the lock-up mode to the torque converter mode by: draining fluid PF2 from apply pressure chamber 128 via groove 142 and channel 150; pumping fluid PF1 into release pressure chamber 128 via through-bore 132; displacing, with fluid PF1, piston plate 124 in axial direction AD2; and opening lock-up clutch 108.

The following should be viewed in light of FIGS. 6 through 10. The following describes a method of operating torque converter 200. Although the method is presented as a sequence of steps for clarity, no order should be inferred from the sequence unless explicitly stated. A first step operates torque converter 200 in the torque converter mode by: receiving a rotational torque with cover 202; and transmitting the rotational torque to output element 176 via impeller 104 and turbine 106. A second step shifts from the torque converter mode to a lock-up mode by: draining fluid PF1 from release pressure chamber 212 via groove 230;

pumping fluid PF2 into apply pressure chamber 214 via channel 228 and through-bore 216; displacing, with fluid PF2, piston plate 124 in axial direction AD1; closing lock-up clutch 204; and transmitting the rotational torque to output element 176 via damper 168 and lock-up clutch 204. A third step shifts from the lock-up mode to the torque converter mode by: draining fluid PF2 from apply pressure chamber 214 via through-bore 216 and channel 228; pumping fluid PF1 into release pressure chamber 212 via groove 230; displacing, with fluid PF1, piston plate 124 in axial direction AD2; and opening lock-up clutch 204.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
PF1 pressurized fluid
PF2 pressurized fluid
RD1 radial direction
RD2 radial direction
100 torque converter
102 cover
104 impeller
106 turbine
108 lock-up clutch
110 stator
112 surface, cover
114 impeller shell
116 impeller blade
118 turbine shell
120 turbine blade
122 stator blade
124 piston plate
126 seal plate
127 surface, seal plate
128 release pressure chamber
130 apply pressure chamber
132 through-bore
134 end, through-bore
136 end, through-bore
138 edge, cover
140 edge, seal plate
142 groove
144 end, groove
146 end, groove
148 hub
150 channel
152 portion, cover
154 portion, seal plate
156 seal
158 inner end, piston plate
160 portion, seal
162 surface, cover
164 axial end, cover
166 gap
168 pendulum vibration damper
170 clutch plate
172 retainer plate
174 spring
176 output element
178 spring
180 pendulum damper
182 pressure chamber
184 opening
185 seal
186 opening
188 opening
190 impeller hub
200 torque converter
202 cover
204 lock-up clutch
206 surface, cover
208 seal plate
210 surface, seal plate
212 release pressure chamber
214 apply pressure chamber
216 through-bore
218 end, through-bore
220 end, through-bore
222 edge, cover
224 edge, seal plate
226 hub
228 channel
230 groove
232 end, groove
234 end, groove
236 portion, seal plate
238 portion, cover
240 surface, seal plate

The invention claimed is:

1. A torque converter, comprising:
a cover arranged to receive rotational torque and including a first surface facing at least partly in a first radial direction orthogonal to an axis of rotation of the torque converter;
an impeller including:
an impeller shell fixed to the cover; and,
at least one impeller blade fixed to the impeller shell;
a turbine including:
a turbine shell; and,
at least one turbine blade fixed to the turbine shell;
a stator including at least one stator blade axially disposed between the impeller shell and the turbine shell; and,
a lock-up clutch including:
a piston plate; and,
a seal plate including a second surface in a press fit with the first surface, wherein:
the cover and the piston plate define at least a portion of a first pressure chamber;
the piston plate and the seal plate define at least a portion of a second pressure chamber;
the first pressure chamber and the second pressure chamber are arranged to receive and expel a fluid to axially displace the piston plate to open and close the lock-up clutch;
the cover and the seal plate define:
a through-bore with a first end terminating at the first pressure chamber, the cover includes an edge defining the first end of the through-bore; or, a through-bore with a first end terminating at the second pressure chamber, the seal plate includes an edge defining the first end of the through-bore.

2. The torque converter of claim 1, wherein:
the cover and the seal plate define the through-bore with the first end terminating at the first pressure chamber; and,
the seal plate includes an edge defining a second end of the through-bore.

3. The torque converter of claim 1, wherein:
the cover and the seal plate define the through-bore with the first end terminating at the first pressure chamber; and,
the cover and the seal plate define a groove with a first end terminating at the second pressure chamber.

4. The torque converter of claim 3, further comprising:
a hub non-rotatably connected to the cover, wherein:
the axis of rotation of the torque converter passes through a material forming the hub;
the hub and the seal plate define, at least in part, a channel; and,
the cover and the seal plate define a second end of the groove terminating at the channel.

5. The torque converter of claim 1, wherein:
the cover and the seal plate define the through-bore with the first end terminating at the first pressure chamber;
the cover and the seal plate define a groove with an end terminating at the second pressure chamber;
the piston plate includes a radially innermost end;
the lock-up clutch includes a seal in contact with the radially innermost end and the cover;
the first end of the through-bore is located past the seal in a first axial direction parallel to the axis of rotation; and,
the end of the groove is located past the seal in a second axial direction, opposite the first axial direction.

6. The torque converter of claim 1, wherein:
the cover and the seal plate define the through-bore with the first end terminating at the second pressure chamber; and,
the cover includes an edge defining a second end of the through-bore.

7. The torque converter of claim 6, further comprising:
a hub non-rotatably connected to the cover, wherein:
the axis of rotation of the torque converter passes through a material forming the hub;
the hub and the cover define at least a portion of a channel; and,
the second end of the through-bore terminates at the channel.

8. The torque converter of claim 1, wherein:
the cover and the seal plate define the through-bore with the first end terminating at the second pressure chamber; and,
the cover and the seal plate define a groove with a first end terminating at the first pressure chamber.

9. The torque converter of claim 1, wherein:
the cover and the seal plate define the through-bore with the first end terminating at the first pressure chamber;
the seal plate includes an edge defining a second end of the through-bore; and,
the cover and the seal plate define a groove with a first end terminating at the second pressure chamber.

10. The torque converter of claim 1, wherein:
the cover and the seal plate define the through-bore with the first end terminating at the second pressure chamber;
the cover includes an edge defining a second end of the through-bore; and,
the cover and the seal plate define a groove with a first end terminating at the first pressure chamber.

11. A torque converter, comprising:
a cover arranged to receive rotational torque and including a first surface facing at least partly in a first radial direction orthogonal to an axis of rotation of the torque converter;
an impeller including:
an impeller shell fixed to the cover; and,
at least one impeller blade fixed to the impeller shell;
a turbine including:
a turbine shell; and,
at least one turbine blade fixed to the turbine shell;
a stator including at least one stator blade axially disposed between the impeller shell and the turbine shell; and,
a lock-up clutch including:
a piston plate; and,
a seal plate including a second surface in a press fit with the first surface, wherein:
the cover and the piston plate define at least a portion of a first pressure chamber;
the piston plate and the seal plate define at least a portion of a second pressure chamber;
the first pressure chamber and the second pressure chamber are arranged to receive and expel a fluid to axially displace the piston plate to open and close the lock-up clutch; and,
a portion of the cover and a portion of the seal plate completely define a groove with a first end:
terminating at the first pressure chamber; or,
terminating at the second pressure chamber.

12. The torque converter of claim 11, wherein:
the portion of the cover and the portion of the seal plate define the groove with the first end terminating at the first pressure chamber; and,
the portion of the seal plate is disposed radially outwardly of the portion of the cover.

13. The torque converter of claim 11, wherein:
the portion of the cover and the portion of the seal plate define the groove with the first end terminating at the second pressure chamber; and,
the portion of the cover is disposed radially outwardly of the portion of the seal plate.

14. The torque converter of claim 11, wherein:
the portion of the cover and the portion of the seal plate define the groove with the first end terminating at the second pressure chamber; and,
the portion of the cover and the portion of the seal plate define a through-bore with a first end terminating at the first pressure chamber.

15. The torque converter of claim 14, wherein
the portion of the cover includes an edge defining the first end of the through-bore; and,
the portion of the seal plate includes an edge defining a second end of the through-bore.

16. The torque converter of claim 14, further comprising:
a hub non-rotatably connected to the cover, wherein:
the axis of rotation of the torque converter passes through the hub;
the hub and the cover define, at least in part, a channel; and,
the portion of the cover and the portion of the seal plate define a second end of the groove terminating at the channel.

17. The torque converter of claim 11, wherein:
the portion of the cover and the portion of the seal plate define the groove with the first end terminating at the first pressure chamber; and,
the portion of the cover and the portion of the seal plate define a through-bore with a first end terminating at the second pressure chamber.

18. The torque converter of claim 17, wherein
the portion of the seal plate includes an edge defining the first end of the through-bore; and,
the portion of the cover includes an edge defining a second end of the through-bore.

19. A method of operating a torque converter including a cover, an impeller, a turbine, a stator, an output element, and a lock-up clutch including a piston plate and a seal plate non-rotatably connected to the cover, the method comprising:
operating in a torque converter mode by:
receiving a rotational torque with the cover; and,
transmitting the rotational torque to the output element via the impeller and the turbine; and,
shifting from the torque converter mode to a lock-up mode by:
draining a first fluid from a release pressure chamber defined at least in part by the cover and the piston plate via a through-bore with a first end defined by an edge of the cover and a second end defined by an edge of the seal plate, pumping a second fluid into an apply pressure chamber defined at least in part by the piston plate and the seal plate via a groove defined by the cover and the seal plate, displacing the piston plate in a first axial direction with the second fluid, closing the lock-up clutch, and transmitting the rotational torque to the output element via the lock-up clutch; or,
draining a first fluid from a release pressure chamber defined at least in part by the cover and the piston plate via a groove defined by the cover and the seal plate, pumping a second fluid into an apply pressure chamber defined at least in part by the piston plate and the seal plate via a through-bore with a first end defined by an edge of the cover and a second end defined by an edge of the seal plate, displacing the piston plate in a first axial direction with the second fluid, closing the lock-up clutch, and transmitting the rotational torque to the output element via the lock-up clutch.

20. The method of claim 19, further comprising:
shifting from the torque converter mode to the lock-up mode by draining the first fluid from the release pressure chamber via the through-bore, pumping the second fluid into the apply pressure chamber via the groove, displacing the piston plate in the first axial direction with the second fluid, closing the lock-up clutch, and transmitting the rotational torque to the output element via the lock-up clutch, and shifting from the lock-up mode to the torque converter mode by draining the second fluid from the apply pressure chamber via the groove, pumping the first fluid into the release pressure chamber via the through-bore, displacing the piston plate in a second axial direction opposite the first axial direction with the first fluid, opening the lock-up clutch, and transmitting the rotational torque to the output element via the impeller and the turbine; or,
shifting from the torque converter mode to the lock-up mode by draining the first fluid from the release pressure chamber via the groove, pumping the second fluid into the apply pressure chamber via the through-bore, displacing the piston plate in the first axial direction with the second fluid, closing the lock-up clutch, and transmitting the rotational torque to the output element via the lock-up clutch, and shifting from the lock-up mode to the torque converter mode by draining the second fluid from the apply pressure chamber via the through-bore, pumping the first fluid into the release pressure chamber via the groove, displacing the piston plate in a second axial direction opposite the first axial direction with the first fluid, opening the lock-up clutch, and transmitting the rotational torque to the output element via the impeller and the turbine.

* * * * *